Patented Apr. 13, 1943

2,316,465

UNITED STATES PATENT OFFICE 2,316,465

PRODUCTION OF CONDENSATION PRODUCTS OF KETENE

Hanns Peter Staudinger, Ewell, and Karl Heinrich Walter Tuerck, Banstead, England, assignors to The Distillers Company Limited, Edinburgh, Scotland, a British company No Drawing. Application June 27, 1941, Serial No. 400,118. In Great Britain March 8, 1940

3 Claims. (Cl. 260—544)

The present invention is for improvements in or relating to the production of condensation products of ketene, ketene derivatives, or polymers thereof, with halogenated aliphatic ethers.

According to the present invention a process for the production of condensation products of ketene comprises reacting ketene, a ketene polymer such as diketene, or a ketene derivative such as a ketene acetal, with an α-halogenated aliphatic ether in the presence of a condensing catalyst. The process is particularly described herein with reference to the production of β-methoxy-propionyl chloride from chloro-dimethyl ether, but may be applied equally to other α-chloro-ethers or to other alpha halogen substituted ethers, e. g. α-bromo-ethers may be used to produce the corresponding acid bromides.

Suitable catalysts are metal halides, such as zinc chloride, aluminium chloride and mercuric chloride.

Condensation may be carried out by passing gaseous ketene into the liquid chlorinated ether in which the catalyst is dissolved or suspended. Preferably, however, the reaction is carried out in the presence of a diluent which is inert under the conditions of reaction, such as carbon disulphide, cyclohexane or an organic ether, e. g. di-isopropyl ether. In this case the reaction components, or at least one of them and preferably also the catalyst, are added to the diluent in portions. For example ketene may be dissolved in a suitable solvent, and to this solution is added the required amount of chloro-dimethyl ether, and eventually the necessary quantity of catalyst. The reaction may be carried out under increased pressure, particularly in those cases where it is desired to operate in the liquid phase at increased temperatures.

In place of ketene, ketene polymers such as diketene or a ketene acetal may be caused to react with α-halogenated ethers, for example an acetyl-methoxy-propionyl chloride would result from the interaction of diketene with chloro-dimethyl ether.

The acid chlorides obtained may be converted into the corresponding acids or salts by the action of saponifying agents, or into esters by interaction with an alcohol.

The reaction between ketene and an α-halogenated aliphatic ether is believed to take place as a result of the ionisation of the halogen atom of the ether, the molecule of ketene then uniting with the ether residue and the halogen atom uniting with the carbonyl group of the ketene molecule to form the acyl halide.

It has been found that in the saponification or esterification reaction of the acyl halides thus formed the reaction product still contains a small amount of chlorine and it is thought possible that this may be due to the above reaction proceeding with the ketene molecule in part reacting with its carbonyl group uniting with the ether residue, the halogen atom thereupon uniting with the methylene group of the ketene molecule. Such secondary reaction products have not been isolated from the reaction mixture.

The following example illustrates the process of the invention:

Ketene, admixed with methane as a diluent, is led into 60 gms. of chlorodimethyl ether, containing 5 gms. of aluminium chloride and maintained at about 50° C., for about four hours. Ethyl alcohol is then added to the reaction mixture and the whole is allowed to stand for some hours. The excess chlorodimethyl ether and ethyl alcohol are then distilled off and the residue yields a fraction of about 10 gms. boiling point 80° C./20 mm. which is apparently ethyl β-methoxy-propionate.

The reactions taking place during the carrying out of the example are set out in the following equations:

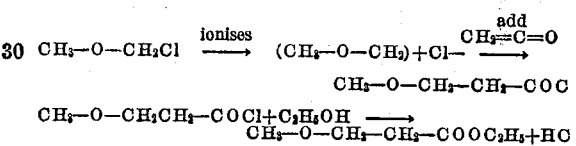

The β-alkoxy acids, or their esters, obtained from ketene give rise to the corresponding acrylic acids or esters when heated in the presence of a dehydrating catalyst.

What we claim is:

1. A process for the production of beta alkoxy acid halides comprising reacting one of a group consisting of ketene and diketene with an α-halogenated aliphatic ether in the presence of a condensation catalyst.

2. A process according to claim 1 wherein the reaction is carried out in the presence of an inert diluent.

3. A process according to claim 1 wherein the process is carried out in the presence of a metal halide condensation catalyst and in the presence of methane as a diluent at a temperature of about 50° C.

HANNS PETER STAUDINGER.
KARL HEINRICH WALTER TUERCK.